US009469156B2

(12) United States Patent
Bueter et al.

(10) Patent No.: US 9,469,156 B2
(45) Date of Patent: Oct. 18, 2016

(54) WHEEL HUB, IN PARTICULAR AN AIRCRAFT WHEEL HUB

(71) Applicants: ROEDER PRAEZISION GMBH, Egelsbach (DE); FRAUNHOFER-GESELLSCHAFT ZUR FOERDERUNG DER ANGEWANDTEN FORSCHUNG E.V., Munich (DE)

(72) Inventors: Andreas Bueter, Kirchheim unter Teck (DE); Erik Bormann, Darmstadt (DE); Paul Becker, Weiterstadt (DE); Branko Kupresanin, Egelsbach (DE)

(73) Assignees: ROEDER PRAEZISION GMBH, Egelsbach (DE); FRAUNHOFER-GESELLSCHAFT ZUR FOERDERUNG DER ANGEWANDTEN FORSCHUNG E.V., Munich (DE)

(*) Notice: Subject to any disclaimer, the term of this patent is extended or adjusted under 35 U.S.C. 154(b) by 80 days.

(21) Appl. No.: 14/479,599

(22) Filed: Sep. 8, 2014

(65) Prior Publication Data
US 2015/0069819 A1  Mar. 12, 2015

(30) Foreign Application Priority Data

Sep. 9, 2013 (DE) .................. 10 2013 217 919

(51) Int. Cl.
*B60B 25/04* (2006.01)
*B60B 25/14* (2006.01)
(Continued)

(52) U.S. Cl.
CPC ............. *B60B 25/045* (2013.01); *B60B 3/004* (2013.01); *B60B 3/02* (2013.01); *B60B 5/02* (2013.01); *B60B 25/08* (2013.01); *B60B 25/14* (2013.01); *B60B 25/16* (2013.01); *B60B 2200/00* (2013.01); *B60B 2320/10* (2013.01); *B60B 2900/111* (2013.01); *B60B 2900/112* (2013.01); *B60B 2900/521* (2013.01); *B60Y 2200/51* (2013.01); *Y10T 29/49535* (2015.01)

(58) Field of Classification Search
CPC ..... B60B 25/045; B60B 25/04; B60B 25/08; B60B 25/14; B60B 25/16; B60B 5/02; B60B 3/02; B60B 3/004; B64C 25/36
See application file for complete search history.

(56) References Cited

U.S. PATENT DOCUMENTS 3,783,927 A * 1/1974 Verdier .................. B60B 25/22
152/405
3,790,220 A 2/1974 Manss
(Continued)

FOREIGN PATENT DOCUMENTS

CN    1244467     2/2000
CN    201941516   8/2011
(Continued)

OTHER PUBLICATIONS

European Office Action conducted in counterpart European Appln. No. 141 80 925.1-1752/2848426 (Feb. 18, 2015) (w/ machine translation).
(Continued)

*Primary Examiner* — John Walters
*Assistant Examiner* — James Triggs
(74) *Attorney, Agent, or Firm* — Greenblum & Bernstein, P.L.C.

(57) ABSTRACT

Wheel hub and method for forming a wheel hub. Wheel hub includes a rim having a circumferential surface with axial ends, and one rim flange being arranged at each axial end of the circumferential surface. The rim includes a fiber-reinforced plastic as a main component and each of the rim flanges is releasably connectable to the rim.

17 Claims, 2 Drawing Sheets

(51) Int. Cl.
  *B60B 3/00* (2006.01)
  *B60B 3/02* (2006.01)
  *B60B 5/02* (2006.01)
  *B60B 25/08* (2006.01)
  *B60B 25/16* (2006.01)

(56) References Cited

U.S. PATENT DOCUMENTS

| | | | |
|---|---|---|---|
| 5,018,795 A | | 5/1991 | Engerand et al. |
| 5,234,259 A | | 8/1993 | Nishimuro et al. |
| 6,726,292 B1 | * | 4/2004 | Schroeder ................. B60B 5/02 301/104 |
| 7,546,910 B2 | * | 6/2009 | Thorp ..................... F16D 55/36 188/71.6 |
| 2005/0067079 A1 | | 3/2005 | Rolla |
| 2005/0265644 A1 | * | 12/2005 | Waseda ..................... F16C 9/04 384/499 |
| 2009/0026832 A1 | * | 1/2009 | Baumgartner ........ F16F 15/324 301/37.24 |
| 2012/0248855 A1 | * | 10/2012 | Shamo ................... B60B 3/047 301/64.307 |
| 2013/0140875 A1 | | 6/2013 | Cragg |

FOREIGN PATENT DOCUMENTS

| | | |
|---|---|---|
| CN | 201989561 | 9/2011 |
| CN | 103038067 | 4/2013 |
| DE | 25 13 156 | 10/1975 |
| DE | 41 29 733 | 3/1992 |
| DE | 197 02 323 | 7/1998 |
| DE | 10 2012 001 881 | 3/2013 |
| DE | 10 2012 103 004 | 6/2013 |
| DE | 102 012 103 004 | 6/2013 |
| EP | 2 576 243 | 4/2013 |
| GB | 1 302 225 | 1/1973 |
| GB | 1 499 893 | 2/1978 |

OTHER PUBLICATIONS

Australia Office Action conducted in counterpart Australia Appl. No. 2014221218 (Jul. 3, 2015).
Canada Office Action conducted in counterpart Canada Appl. No. 2,861,860 (Jul. 30, 2015).
German Office Action conducted in counterpart German Appln. No. 10 2013 217 919.7 (Apr. 22, 2014).
China Office Action conducted in counterpart China Appl. No. 2016013000005790 (Feb. 3, 2016) (w/ English language translation).
China Second Office Action conducted in counterpart China Appl. No. 20141055734.9 (Jul. 27, 2016) (w/ English language translation).

* cited by examiner

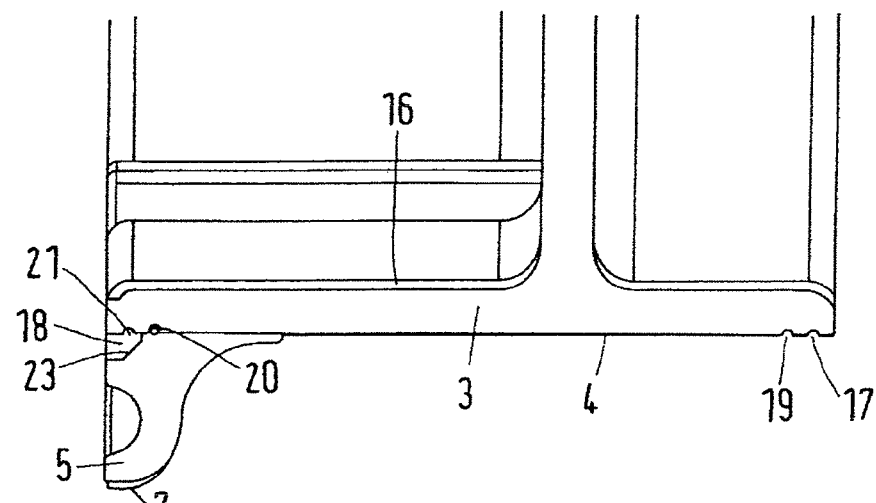
Fig.2
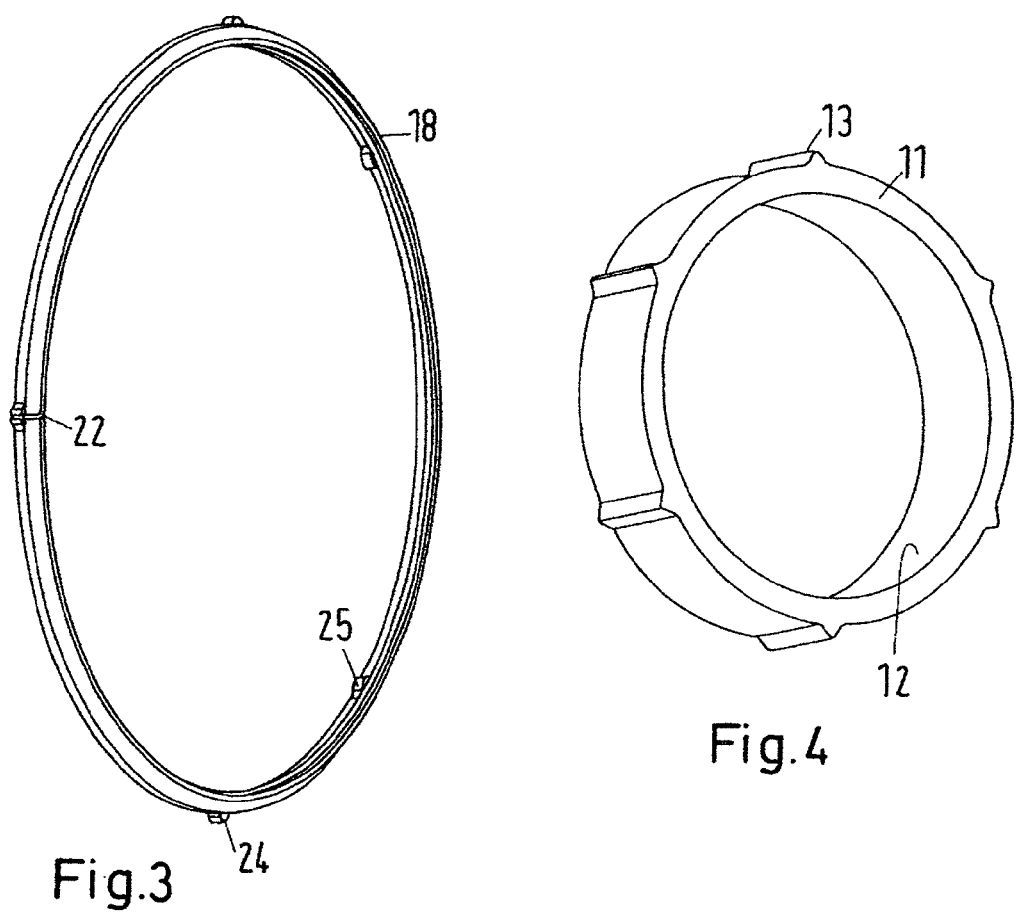
Fig.3
Fig.4

WHEEL HUB, IN PARTICULAR AN AIRCRAFT WHEEL HUB

CROSS-REFERENCE TO RELATED APPLICATIONS

The present application claims priority under 35 U.S.C. §119 of German Patent Application No. DE 10 2013 217 919.7, filed Sep. 9, 2013, the disclosure of which is expressly incorporated by reference herein in its entirety.

BACKGROUND OF THE INVENTION

1. Field of the Invention

Embodiments of the invention relate to a wheel hub, in particular an aircraft wheel hub, having a rim, which comprises a circumferential surface, and respectively one rim flange at the axial ends of the rim.

2. Discussion of Background Information

Together with a tire, a wheel hub forms a wheel on which vehicles or aircraft can roll, provided they are on the ground. A wheel belongs to the non-springable masses on the vehicle and should therefore have a lowest possible mass. For an aircraft, the low mass is of particular significance, since the wheel must also be transported in the aircraft and thus increases the empty weight of the aircraft.

While a rim is often formed from steel in the case of vehicles, a light metal, such as aluminum, is predominantly used for an aircraft wheel hub. Here, the wheel hub is bisected in an axial direction so that, for the mounting of the tire, the wheel hub can be disassembled, attached to the tires from both axial sides, and then connected to one another again. The connection often occurs with the use of multiple studs or screw/nut connections which are distributed uniformly in a circumferential direction. The mounting of an aircraft wheel of this type thereby becomes relatively complex, which is associated with increased costs.

SUMMARY OF THE EMBODIMENTS

Embodiments of the invention are directed to a wheel hub which creates few costs.

According to embodiments, a wheel hub of the type named at the outset includes a rim having a fiber-reinforced plastic as a main component and in which each of the rim flanges is releasably connected to the rim.

A wheel hub of this type has a number of advantages. Since the rim is essentially composed of a fiber-reinforced plastic, in particular a carbon-fiber-reinforced plastic, it can be embodied or formed with a relatively low mass. The mass can be kept lower than, for example, in the case of aluminum as a main component. Since the two rim flanges are releasably connected to the rim, the rim can be embodied or formed in a relatively simple manner at its outer circumference. In principle, it is sufficient to embody or form the circumferential surface of the rim as a cylindrical jacket surface, wherein a few modifications of the cylindrical outer surface may be required to be able to connect the rim flanges to the rim. The simple shape of the circumferential surface facilitates and simplifies the production of the wheel hub so that the costs can be kept low. Since both rim flanges are releasably connected to the rim, it is possible, in the event of damage to a rim flange, to merely replace this rim flange, while the remaining parts of the wheel hub can continue to be used. This keeps the costs for repair and maintenance low. Because the wheel hub no longer needs to be completely disassembled to be able to mount a tire, but rather it is merely necessary to release one of the rim flanges from the rim, the mounting times, and therefore also the mounting costs, are kept small. Overall, there thus results significant cost advantages both in the production and also in the maintenance and the servicing of the wheel hub.

Preferably, at least one rim flange has a fiber reinforced plastic as a main component. Here, too, a carbon-fiber-reinforced plastic can be used. If the rim flange is formed from a fiber-reinforced plastic, then the reinforcing fibers can be run in a circumferential direction of the rim flange so that the rim flange exhibits a good dimensional stability in a radial direction. The rim itself can also be embodied or formed at the circumferential surface with reinforcing fibers reinforced in a circumferential direction so that an equally good dimensional stability results. The rim and the rim flange can then be matched to one another with high precision.

Preferably, the rim flange is provided with a run protection layer. The run protection layer can be formed, for example, by protective layers of aramid fibers or para-aramid fibers. With a run protection layer of this type, the wheel hub obtains emergency running properties, that is, a rolling is also possible in the case of an aircraft when the tire is damaged or missing (roll on rim).

Preferably, at least one rim flange is slid onto the circumferential surface axially from the outside and secured against a movement axially outwards by a locking element. A securing axially outwards is sufficient when the tire has been mounted and put under pressure. In this case, a movement of the rim flange axially inwards is prevented by the tire. The pressure in the tire, however, presses the rim flange axially outwards against the locking element. A relatively simple mounting thus becomes possible.

Preferably, the locking element forms a rotation protection between the rim and the rim flange. When the rim flange sits on the rim in a rotation-protected manner, an increased protection against the tire rotating on the rim is ensured. In this manner, especially braking forces can be transferred reliably from the rim to the tire.

Preferably, the locking element is engaged with the rim in a positive fit. A positive fit is a simple possibility for effecting the necessary fixing of the locking element on the rim such that the locking element can securely retain the rim flange on the circumferential surface in an axial direction and, possibly, in a circumferential direction.

Here, it is preferred that the locking element is embodied or formed as a clamping ring which engages in a groove on the rim and that the rim flange has a pressure surface acting on the clamping ring and loads the clamping ring with a force component acting into the groove. For the mounting, the rim flange is thus first slid axially onto the circumferential surface of the rim. After this, the clamping ring, which can indeed also be formed from multiple parts in a circumferential direction, is attached to the rim and engages in the groove of the rim. In the simplest case, the groove is embodied or formed in the circumferential surface. If the clamping ring is embodied or formed in one piece, it is interrupted once in a circumferential direction and can thus be spread open in order to engage with the groove. Once the clamping ring is mounted, the rim flange can be displaced radially outwards and comes into contact with the clamping ring, namely such that the rim flange prevents a radial expansion of the clamping ring and even presses the clamping ring into the groove with a certain force. It is thus virtually impossible for the clamping ring to move out of the groove. The rim flange is thus securely retained on the circumferential surface of the rim.

Preferably, a support arrangement for a wheel bearing is inserted into the rim. The support arrangement is thus initially a separate component that is connected to the rim. Since the rim is essentially formed from a plastic, the support arrangement facilitates the mounting of a wheel bearing, which possibly could not be fastened very well in the plastic itself.

Preferably, the support arrangement comprises a split bearing shell. It is thus possible, for example, to install a part of the bearing shell in the rim from both axial ends. The wheel bearing can then be supported in the rim at two positions spaced axially apart from one another, without a continuous bearing shell with a correspondingly large mass being necessary.

Preferably, the support arrangement is wrapped in an inextensible layer. When a wheel bearing is pressed into the support arrangement, a radial expansion of the support arrangement is avoided. This could lead to the wheel bearing overall rotating in the support arrangement, which is undesirable.

It is also advantageous if the support arrangement is retained non-rotatably in the rim by positive fit. The positive fit can be produced in various manners. It is thus possible, for example, to provide the support arrangement with a polygonal outer contour. Another possibility is to provide the support arrangement with projections or recesses so that spokes of the support arrangement or of the plastic are formed, which prevent a rotation of the support arrangement in the rim.

It is also advantageous if the rim has an inner circumference which is at least partially provided with a thermal radiation reflection layer. A thermal radiation reflection layer of this type is above all advantageous if a brake, primarily a friction brake, is arranged in the wheel hub. If a brake of this type is actuated, then it produces a relatively large amount of heat. The thermal radiation reflection layer then helps to keep the effects of the thermal radiation on the rim small so that the plastic of the rim is not thermally overloaded.

Here, it is preferred that the thermal radiation reflection layer is embodied or formed as a film which is adhered to the inner circumference. The film has only a small thickness in a radial direction so that spatial problems play virtually no role. The film can, for example, comprise a mixture of aluminum and aramid.

It is also advantageous if the film has an insulating layer. An insulating layer can, for example, be formed by a gas layer. The gas layer can be retained by a foam.

Preferably, catches for a braking device protrude from the inner circumference and the thermal radiation reflection layer is arranged between the catches. This facilitates the production.

Embodiments of the invention are directed to a wheel hub that includes a rim having a circumferential surface with axial ends, and one rim flange being arranged at each axial end of the circumferential surface. The rim includes a fiber-reinforced plastic as a main component and each of the rim flanges is releasably connectable to the rim.

According to embodiments, the wheel hub can be an aircraft wheel hub.

In accordance with embodiments, at least one of the rim flanges may include a fiber-reinforced plastic as a main component.

According to further embodiments, the wheel hub can include a run protection layer arranged on at least one of the rim flanges.

In embodiments, the wheel hub may include a locking element. At least one of the rim flanges can be structured to slide onto the circumferential surface axially from an outside and may be secured against a movement axially outwards by the locking element. The locking element can be structured and arranged to form a rotation protection between the rim and the rim flange. Further, the locking element may be engageable with the rim in a positive fit. The locking element can be structured as a clamping ring to engage in a groove on the rim and the rim flange may have a pressure face structured to act on the clamping ring and load the clamping ring with a force component acting into the groove. The wheel hub can include a support arrangement for a wheel bearing being insertable into the rim. The support arrangement may include a divided bearing shell. Further, the support arrangement can be wrapped in an inextensible layer. The support arrangement may also be non-rotatably retained in the rim by a positive fit.

In accordance with still other embodiments, the wheel hub can include a thermal radiation reflection layer. The circumferential surface of the rim may have an inner circumference that is at least partially provided with the thermal radiation reflection layer. The thermal radiation reflection layer may be formed as a film that is adhered to the inner circumference. Moreover, the film can include an insulating layer. Still further, catches for a braking device can protrude from the inner circumference and the thermal radiation reflection layer may be arranged between the catches.

Embodiments of the invention are directed to a method of forming a wheel hub that includes a rim having a circumferential surface having axial ends. The method includes releasably connecting a rim flange onto at each axial end of the circumferential surface. The rim includes a fiber-reinforced plastic as a main component.

In embodiments, the releasable connection of one rim flange onto each axial end of the circumferential surface can include axially sliding at least one of the rim flanges onto the circumferential surface from an outside and securing the at least one rim flange against a movement axially outwards.

In accordance with still yet other embodiments of the present invention, the method can include at least partially applying a thermal radiation reflection layer onto an inner circumference of the circumferential surface. The thermal radiation reflection layer can include a film with an insulating layer.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 shows a sectional view through a part of the wheel hub;

FIG. 3 shows a clamping ring; and

FIG. 4 shows a part of a bearing shell.

DETAILED DESCRIPTION OF THE EMBODIMENTS

Figure 1:
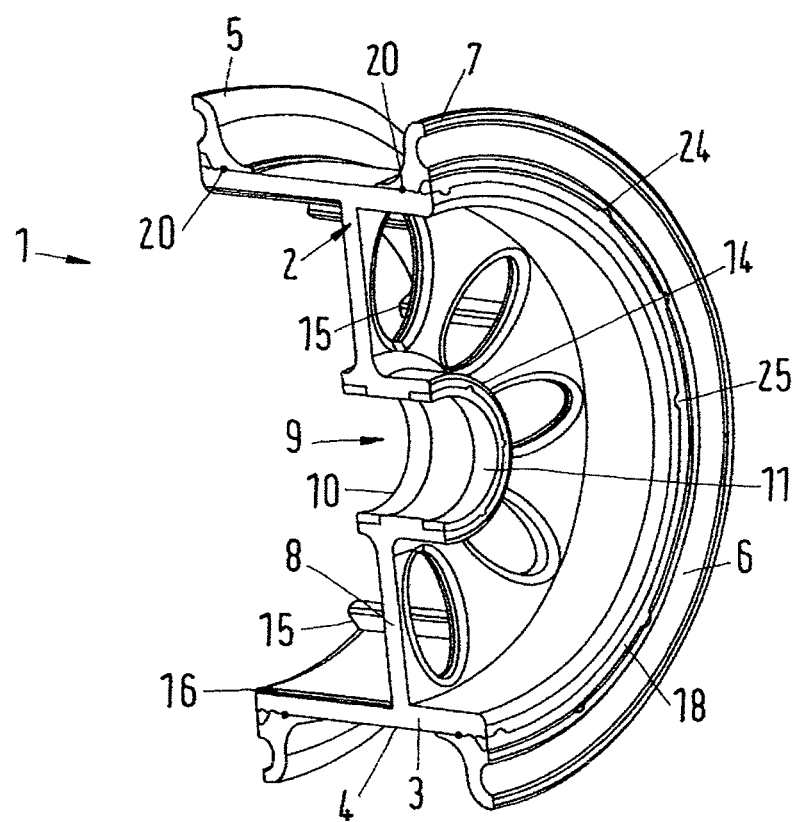
FIG. 1 shows a wheel hub in a perspective representation, partially cut.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

FIG. 1 shows a wheel hub 1 in a perspective representation, partially in section. In the present case, the wheel hub 1 is intended for an aircraft wheel. An aircraft wheel should have a lowest possible mass.

The wheel hub 1 has a rim 2 which is essentially formed from a fiber-reinforced plastic, in particular a carbon-fiber-reinforced plastic. The rim 2 comprises a rim well 3 with a circumferential surface 4. The circumferential surface 4 is embodied or formed in a cylinder jacket shape and, with a few exceptions described in greater detail below, is smooth.

Two rim flanges 5, 6 are slid onto the circumferential surface 4 axially from the outside. This is possible because the circumferential surface 4, as explained above, is designed as a cylinder jacket surface.

The rim flanges 5, 6 are likewise formed from a fiber-reinforced plastic, in particular a carbon-fiber reinforced plastic. The rim flanges 5, 6 have at least at the outer circumference thereof a run protection layer 7, which can be formed, for example, from aramid or para-armid. In this manner, the wheel hub 1 obtains emergency running properties which are often required for aircraft wheels. Should the tire (not illustrated in greater detail) be damaged or even completely missing, then the aircraft can roll directly on the circumferential surface of the rim flanges 5, 6. This is also referred to as a "roll on rim."

The rim well 3 is connected to a bearing region 9 by a rim center 8. In the bearing region 9, a support arrangement for a wheel bearing, which is not illustrated in greater detail, is inserted into the rim 2. In the present case, the support arrangement comprises two parts 10, 11 of a bearing shell. The two parts 10, 11 are inserted into the bearing region 9 from both axial ends, so that it is possible to support a wheel bearing in the rim 2 at two positions spaced axially apart from one another, without a continuous bearing shell being required.

FIG. 4 shows the part 11 of the bearing shell. The part 11 of the bearing shell has a smooth inner circumference 12 into which a bearing can be pressed or contracted. Furthermore, the part 11 of the bearing shell comprises projections 13 protruding radially outwards, which penetrate the plastic of the rim 2 and thus form a rotation protection for the bearing shell. The parts 10, 11 of the bearing shell thus cannot rotate with respect to the rim 2. The projections 13 produce a positive fit with the rim 2. This positive fit can also be produced in a different manner, for example, if the parts 10, 11 of the bearing shell have a polygonal outer circumference, or if torsional contact surfaces have been produced in another way.

To prevent a radial expansion of the parts 10, 11 of the bearing shell during the pressing-in of the wheel bearing, the parts 10, 11 are surrounded by an inextensible layer 14. This inextensible layer 14 can, for example, be formed in that reinforcement fibers which are virtually inextensible, for example carbon fibers or glass fibers, are wrapped around the bearing region 9 with a sufficient tension.

The rim well 3 has at the inner circumference thereof multiple catches 15 for a breaking device. These catches protrude radially inwards from the inner circumference. A thermal radiation reflection layer 16 is arranged between the catches 15. The thermal radiation reflection layer 16 is embodied or formed as a film which is adhered to the inner circumference of the rim 2. Additionally, the thermal radiation reflection layer 16 can also comprise an insulating layer, which, for example, contains a foam with a plurality of small gas bubbles. The thermal radiation reflection layer 16 ensures that a thermal radiation produced by a breaking device not illustrated in greater detail does not have an overly negative effect on the plastic of the rim 2.

As can be recognized in particular in FIGS. 1 and 2, the circumferential surface 4 of the rim well 3 has two circumferential grooves in the region of each axial end. An axial outer groove 17 is provided to accommodate a clamping ring 18, which is explained below. A groove 19 positioned axially further to the inside is provided in order to accommodate a seal 20 which is arranged between the circumferential surface 4 and the radial inside of the rim flanges 5, 6 and prevents a gas between the rim 2 and the rim flanges 5, 6 from being able to escape.

For the mounting of the rim flanges 5, 6 on the circumferential surface 4 of the rim well 3, the rim flange 5 is slid onto the circumferential surface 4 in an axial direction. This is possible without further difficulty, since the circumferential surface 4 corresponds to a cylinder jacket surface. Accordingly, a movement of the rim flange 5 on the rim 2 is possible in both an axial direction and also in a circumferential direction. However, the inner circumference of the rim flanges 5, 6 is matched to the outer circumference of the circumferential surface 4 such that a radial motion is virtually impossible, if a play required for the mounting is disregarded.

The rim flange 5, 6 is axially slid somewhat further onto the circumferential surface 4 than the eventual end position. Thus, space is available for the clamping ring 18 to be fitted onto the circumferential surface 4 and to have it enter into the groove 17. For this purpose, the clamping ring 18 has a projection 21 protruding radially inwards.

Except for one gap 22, the clamping ring 18 is closed in a circumferential direction. It can thus be spread open so that the projection 21 can enter into the groove 17. In principle, it can also be embodied or formed in multiple parts.

Once the clamping ring 18 has engaged with the groove 17, the clamping ring 18 forms a protection against a movement of the rim flange 5 axially outwards. The rim flange 5, 6 has a recess which is matched to the shape of the clamping ring 18. In particular, the rim flange 5, 6 comprises a pressure face 23 with which the rim flange 5 presses on the clamping ring 18 and loads the clamping ring with a force component acting into the groove 17 if the rim flange 5 itself is loaded with a pressure, for example, when a mounted tire is put under pressure.

In the mounting position illustrated in FIG. 2 for the rim flange 5, the clamping ring 18 can no longer expand radially, so that it cannot release from the groove 17. Accordingly, the clamping ring 18 forms a locking element which is engaged in a positive fit with the rim 2 and secures the rim flange 5 against a movement axially outwards. Once the tire has been put under pressure, a movement axially inwards is not possible.

As can be seen in particular in FIG. 3, the clamping ring has, distributed in a circumferential direction, a number of projections 24 protruding radially outwards and a number of projections 25 protruding radially inwards. The projections 24 protruding radially outwards engage in corresponding recesses on the rim flange 5, 6. The projections 25 protruding radially inwards engage in corresponding recesses on the rim well 3. To be able to bring the projections 24, 25 into alignment with the corresponding recesses on the rim flanges 5, 6 and on the rim well 3, it may be necessary to rotate the rim flanges 5, 6 somewhat on the circumferential surface 4 during mounting. With the aid of the projections 24, 25, the clamping ring 18 then forms a rotation protection of the rim flanges 5, 6 with respect to the rim 2.

The two rim flanges 5, 6 are structured identically. Thus, there is no differentiation between a "left" rim flange and a "right" rim flange. This facilitates the spare part procurement and inventory holding.

The wheel hub is extremely easy to maintain. If one of the two rim flanges 5, 6 is damaged, it is sufficient to replace the damaged rim flange, without it being necessary to replace the entire wheel hub.

In the mounting of a tire, it is possible to release and reattach the rim flanges 5, 6 on the rim 2 essentially without tools. It is merely necessary to displace one of the two rim flanges 5, 6 slightly inwards in an axial direction to be able to release and re-mount the clamping ring. Then the corresponding rim flange 5, 6 must once again be slid outwards in an axial direction in order to be secured.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A wheel hub comprising:
   a rim having a circumferential surface with axial ends;
   one rim flange being arranged at each axial end of the circumferential surface, wherein the rim comprises a fiber-reinforced plastic as a main component and each of the rim flanges is releasably connectable to the rim; and
   a locking element, wherein at least one of the rim flanges is structured to slide onto the circumferential surface axially from an outside and to be secured against a movement axially outwards by the locking element, and
   wherein the locking element is structured and arranged to form a rotation protection between the rim and the rim flange.

2. The wheel hub according to claim 1 being an aircraft wheel hub.

3. The wheel hub according to claim 1, wherein at least one of the rim flanges comprises a fiber-reinforced plastic as a main component.

4. The wheel hub according to claim 1, further comprising a run protection layer arranged on at least one of the rim flanges.

5. The wheel hub according to claim 1, wherein the locking element is engageable with the rim in a positive fit.

6. The wheel hub according to claim 5, wherein the locking element is structured as a clamping ring to engage in a groove on the rim and the rim flange has a pressure face structured to act on the clamping ring and load the clamping ring with a force component acting into the groove.

7. The wheel hub according to claim 6, further comprising a support arrangement for a wheel bearing being insertable into the rim.

8. The wheel hub according to claim 7, wherein the support arrangement comprises a divided bearing shell.

9. The wheel hub according to claim 7, wherein the support arrangement is wrapped in an inextensible layer.

10. The wheel hub according to claim 7, wherein the support arrangement is non-rotatably retained in the rim by a positive fit.

11. The wheel hub according to claim 1, further comprising a thermal radiation reflection layer, wherein the circumferential surface of the rim has an inner circumference that is at least partially provided with the thermal radiation reflection layer.

12. The wheel hub according to claim 11, wherein the thermal radiation reflection layer is formed as a film that is adhered to the inner circumference.

13. The wheel hub according to claim 12, wherein the film comprises an insulating layer.

14. The wheel hub according to claim 11, wherein catches for a braking device protrude from the inner circumference and the thermal radiation reflection layer is arranged between the catches.

15. A method of forming a wheel hub that includes a rim having a circumferential surface having axial ends, the method comprising:
    releasably connecting a rim flange onto at each axial end of the circumferential surface by axially sliding at least one of the rim flanges onto the circumferential surface from an outside; and securing the at least one rim flange against a movement axially outwards via a locking element,
    wherein the rim comprises a fiber-reinforced plastic as a main component and wherein the locking element is structured and arranged to form a rotation protection between the rim and the rim flange.

16. The method according to claim 15, further comprising at least partially applying a thermal radiation reflection layer onto an inner circumference of the circumferential surface.

17. The method according to claim 16, wherein the thermal radiation reflection layer comprises a film with an insulating layer.

* * * * *